US010855713B2

(12) United States Patent
Iyer et al.

(10) Patent No.: US 10,855,713 B2
(45) Date of Patent: Dec. 1, 2020

(54) PERSONALIZED THREAT PROTECTION (71) Applicant: Microsoft Technology Licensing, LLC, Redmond, WA (US)

(72) Inventors: Varagur Karthikeyan Sriram Iyer, Sammamish, WA (US); Thomas P. Gallagher, Redmond, WA (US); Matthew Bryan Jeffries, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 15/499,632

(22) Filed: Apr. 27, 2017

(65) Prior Publication Data
US 2018/0316711 A1 Nov. 1, 2018

(51) Int. Cl.
*H04L 29/06* (2006.01)
*G06F 9/445* (2018.01)
*H04W 12/12* (2009.01)

(52) U.S. Cl.
CPC ...... *H04L 63/1433* (2013.01); *G06F 9/44505* (2013.01); *H04L 63/14* (2013.01); *H04L 63/1408* (2013.01); *H04W 12/1206* (2019.01); *H04W 12/1208* (2019.01); *H04L 63/1441* (2013.01)

(58) Field of Classification Search
CPC .. H04L 63/1433; H04L 63/14; H06F 9/44505
USPC ....................................................... 726/25
See application file for complete search history.

(56) References Cited

U.S. PATENT DOCUMENTS

| 7,841,008 B1 | 11/2010 | Cole et al. |
| 9,098,709 B2 | 8/2015 | Christodorescu et al. |
| 9,338,175 B1 | 5/2016 | Ramos et al. |
| 9,436,826 B2 | 9/2016 | Kapoor et al. |
| 9,621,585 B1 | 4/2017 | Satish et al. |
| 2009/0183154 A1 | 7/2009 | Miskelly et al. |
| 2010/0077481 A1 | 3/2010 | Polyakov et al. |
| 2013/0074143 A1 | 3/2013 | Bu et al. |
| 2016/0014042 A1 | 1/2016 | Kampas et al. |
| 2016/0224790 A1 | 8/2016 | Gupta |

(Continued)

FOREIGN PATENT DOCUMENTS

| WO | 2016048322 A1 | 3/2016 |
| WO | 2016111970 A1 | 7/2016 |
| WO | 2016112058 A1 | 7/2016 |

OTHER PUBLICATIONS

"Strategies for Managing Malware Risks", https://msdn.microsoft.com/en-us/library/cc875818.aspx, Published on: Aug. 18, 2006, 33 pages.

(Continued)

*Primary Examiner* — Anthony D Brown
(74) *Attorney, Agent, or Firm* — Holzer Patel Drennan (57) ABSTRACT

Implementations described herein disclose a system for providing personalized threat protection for users of computer applications. An implementation of a method disclosed herein includes analyzing usage pattern of an application by a client to determine various application functionalities used by the client, identifying security threats related to the various application functionalities used by the client, and changing the configuration settings of the application for the client based on the plurality of security threats.

20 Claims, 8 Drawing Sheets

(56) References Cited

U.S. PATENT DOCUMENTS

2017/0019312 A1* 1/2017 Meyer .................. G06N 5/048
2018/0190146 A1* 7/2018 Bodnarium ......... H04L 63/1441

OTHER PUBLICATIONS

"Partners 2015", http://web.archive.org/web/20160307211513/http://www.nordicitsecurity.com/partners-2015/, Published on: Mar. 7, 2016, 22 pages.

Rayani, Alym, "Applying intelligence to security and compliance in Office 365", https://blogs.office.com/2016/09/26/applying-intelligence-to-security-and-compliance-in-office-365/, Published on: Sep. 26, 2016, 10 pages.

Mackie, Kurt, "Microsoft Launches Advanced Security Management Service for Office 365", https://redmondmag.com/articles/2016/06/01/security-management-service-for-o365.aspx, Published on: Jun. 1, 2016, 5 pages.

"Microsoft Trust Center", https://www.microsoft.com/en-us/trustcenter/Security/Office365Security, Retrieved on: Dec. 28, 2016, 10 pages.

Campos, Tim, "Why Facebook is betting on Office 365 and the Microsoft Cloud", https://blogs.office.com/2016/07/12/why-facebook-is-betting-on-office-365-and-the-microsoft-cloud/, Published on: Jul. 12, 2016, 3 pages.

Villeneuve, et al., "A New Word Document Exploit Kit", https://www.fireeye.com/blog/threat-research/2015/04/a_new_word_document.html, Published on: Apr. 1, 2015, 19 pages.

"Flash Threats: Not Just in the Browser", http://blog.trendmicro.com/trendlabs-security-intelligence/flash-threats-not-just-in-the-browser, Published on: Jul. 30, 2015, 8 pages.

"New feature in Office 2016 can block macros and help prevent infection", https://blogs.technet.microsoft.com/mmpc/2016/03/22/new-feature-in-office-2016-can-block-macros-and-help-prevent-infection/, Published on: Mar. 22, 2016, 14 pages.

Constantin, Lucian, "New ransomware abuses Windows PowerShell, Word document macros", http://www.computerworld.com/article/3048282/security/new-ransomware-abuses-windows-powershell-word-document-macros.html, Published on: Mar. 25, 2016, 3 pages.

Jiang, Genwei, "CVE-2016-4117: Flash Zero-Day exploited in the wild", https://www.fireeye.com/blog/threat-research/2016/05/cve-2016-4117-flash-zero-day.html, Published on: May 13, 2016, 7 pages.

"No slowdown in Cerber ransomware activity as 2016 draws to a close", https://blogs.technet.microsoft.com/mmpc/, Published on: Dec. 21, 2016, 8 pages.

"International Search Report & Written Opinion Issued in PCT Application No. PCT/US2018/026624", dated Jun. 6, 2018, 11 Pages.

* cited by examiner

PERSONALIZED THREAT PROTECTION

BACKGROUND

Modern day enterprises and consumers alike use a large number of software applications in their daily life and business. Software developers commonly allows a great deal of customization for applications provided to their customers. Software application functionality can generally be enabled or disabled to meet a customer's needs. Common functionality is usually enabled by default to meet the usage patterns of common users. With each passing day, cyber-attacks on software applications are becoming increasingly sophisticated. Attacks are targeted to exploit specific vulnerabilities in specific applications.

SUMMARY

Implementations described herein disclose a system for providing personalized threat protection for users of computer applications. An implementation of a method disclosed herein includes analyzing usage patterns of an application by a client to determine various application functionalities used by the client, identifying security threats related to the various application functionalities used by the client, and changing the configuration settings of the application for the client based on the plurality of security threats.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Modern computer applications include many features and functionalities (referred hereinafter collectively as the "functionalities"). For example, a productivity application, such as a word processor include many functionalities such as spell check, printer setup, addition of figure, tables, etc. Some of these functionalities may be core functionalities for the productivity of the application whereas some other functionalities may be less often used by users. Furthermore, usage patterns of the functionalities of the applications also depend on the user, company or organization (referred to hereinafter as the "client") that the user works for, etc.

Security threats to computer applications often utilize various functionalities of the computer application to attack such applications and/or the computing device using such applications. For example, if a given functionality of an application has access to a resource outside on the computing device, such as certain memory locations, security threats may utilize such access to the resource to attack the computing device of the user or a network of the client.

The technology described herein disclose a system for providing personalized threat protection for users of computer applications. An implementation of the personalized threat protection system disclosed herein includes analyzing usage pattern of a computer application by various users at a client to determine various application functionalities used by the client and its users. In one implementation, usage history of application functionalities is generated, analyzed, and stored over time. Such usage history of the application functionalities may also include information about productivity information of such functionalities, whether such functionalities are core functionalities or non-core functionality, etc.

Once such application functionalities are analyzed, the personalized threat protection system identifies various security threats related to the application functionalities. For example, if a particular functionality has high security threat exposure, the threat protection system may disable that particular functionality and/or change the configuration settings of the application for the client or users based on the security threats. The threat protection system may determine the action to be taken in response to the threat exposure based on the historical data about the usage pattern, the productivity level of the functionality, the amount and type of potential damage or impairment resulting from the potential threat, whether the functionality is a core functionality or not, availability of alternative responses to the security threat, or such other appropriate criteria.

Figure 1:
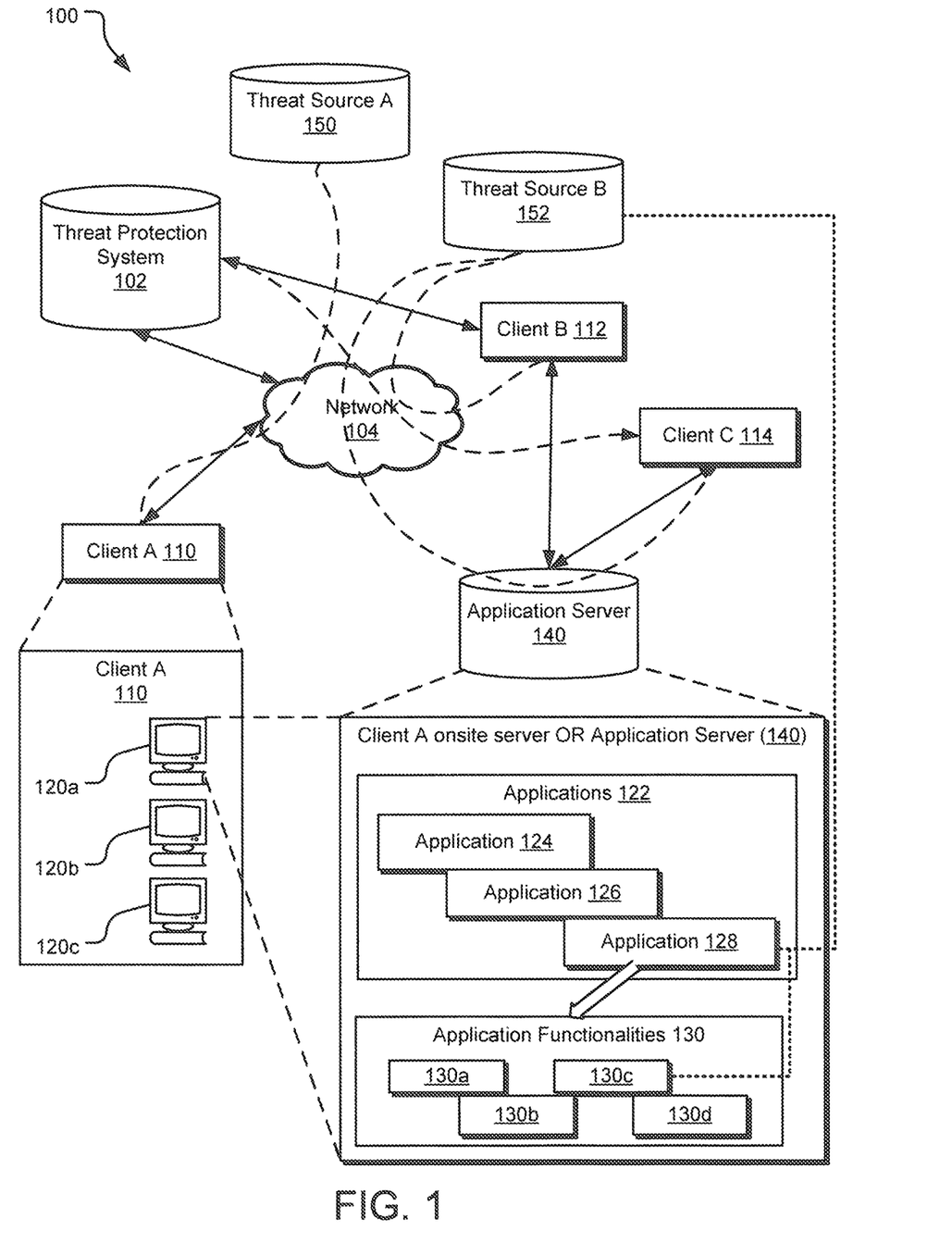
FIG. 1 illustrates an example implementation of system for providing personalized threat protection to users of one or more software applications.

FIG. 1 illustrates an example implementation 100 including a threat protection system 102 for providing personalized threat protection to users of one or more computer applications. Specifically, the threat protection system 102 may provide threat protection to one or more users of various clients such as companies, organizations, etc., from threats to software applications. In the illustrated implementation, the threat protection system 102 is implemented in a cloud environment where various components of the threat protection system 102 may be implemented on one server or in a distributed manner on several servers. The threat protection system 102 is communicatively connected to various clients, such as client A 110, client B 112, client C 114 via a network 104. In one implementation, the network 104 may be the Internet. In alternative implementation, one or more of the clients 110-114 may also be connected to the threat protection system 102 directly via a private network such as a virtual private network (VPN). For example, client B 112 may be connected to the threat protection system 102 directly via a VPN, whereas a client C 114 may be connected to the threat protection system 102 via the network 104.

The clients 110, 112, 114 may use many computer applications including various software applications that may be susceptible to threats. Such threats may be, for example in the form of, viruses, worms, spyware, backdoor, botnet, phishing, cookies, etc. For example, applications may be used as back door to install cookies that may be threat to privacy of the computing device and/or the network. The implementation 100 shows sources of such threats such as a threat source A 150 and threat source B 152. As shown in implementation 100, these threat sources 150, 152 may attack various applications used by the users of the clients 110, 112, 114. In the illustrated implementation 100, client A is illustrated to have users 120a, 120b, 120c that use one or more of the software applications that are available to users of client A 110.

In one implementation, the software applications used by the users 120a, 120b, 120c of client A 110 may be hosted on an application server 140. Alternatively, the software applications may be hosted onsite at client A 110, or distributed over many application servers. For example, the application server 140 hosts applications 122 including different applications 124, 126 and 128. As an example, these may be a word processing application, a presentation application, and an email application. Each of these applications 122 may include many functionalities. For example, as shown in implementation 100, application 128 may have application functionalities 130, including functionalities 130a, 130b, 130c, 130d.

The threat source B 152 may use the functionality 130c of the application 128 to attack the user 120a or the client 110. In the illustrated implementation, the threat protection system 102 monitors usage patterns of the application functionalities 130 over time to collect various usage pattern data. Such usage pattern data may include, for example, the frequency of use of various application functionalities 130, the number of users that use various application functionalities 130, a level of trust associated with one or more of the various application functionalities 130, the productivity factor of various application functionalities 130, the designation of the various functionalities 130 as being core functionality vs non-core functionality, and other characteristics of these functionalities 130.

The threat protection system 102 may also tabulate historical data of how often one of these functionalities 130 is used to attack either the application 128 or the client A 110. For example, the threat protection system 102 may maintain for each functionality 130, a list of threats from various threat sources 150, 152. Furthermore, the threat protection system 102 also identifies security threats related to the various application functionalities 130 used by the client A 110, and determines the configuration settings of the application 128 based on the security threats. For example, the threat protection system 102 may determine that the functionality 130c is not often used by any user of the client A 110 and it is often used by the threat source B 152 to damage the network of the client A 110. In this case, the threat protection system 102 may determine that the configuration setting for the application 128 should be set to turn-off the functionality 130c.

In one implementation, the threat protection system 102 may turn-off the functionality 128 and then notify an administrator for the client A 110. In an alternative implementation, the threat protection system 102 may recommend the administrator of the client A 110 to turn off the functionality 130c for all its users 120. Yet alternatively, the threat protection system 102 may monitor various ongoing threats and turn off one or more of the functionalities 130 based on the current level of such ongoing threats. In this case, once the threat protection system 102 determines that when threat level for a threat that is more likely to use the functionality 130a is above a threshold, the threat protections system 102 may turn-off the functionality 130a. Subsequently, once a patch is available to mitigate such a threat or when the threat level is reduced to below the threshold, the threat protection system 102 may activate the functionality 130a. Alternatively, even if the threat level for a threat that is likely to use functionality 130a is above a threshold, if functionality 130a is a core functionality that is used very often and when turning it off will adversely affect the productivity of the application 128, the threat protection system may merely notify the user 120a or the administrator of the client a 110 and change one or more configuration settings of the application 128 so as to mitigate the risk from such a threat.

While in the implementation 100, the threat protection system 102 is cloud based, in an alternative implementation, the threat protection system 102 may be located on an internal network of various clients, such as client A 110. Yet alternatively, individual users that are not part of any client network may also be able to use the threat protection service of the threat protection system 102. For example, a user with an application on her personal computing device may be able to sign up for the threat protection service of the threat protection system 102. Alternatively, application server 140 may register the application 128 for the threat protection service of the threat protection system 102.

Figure 2:
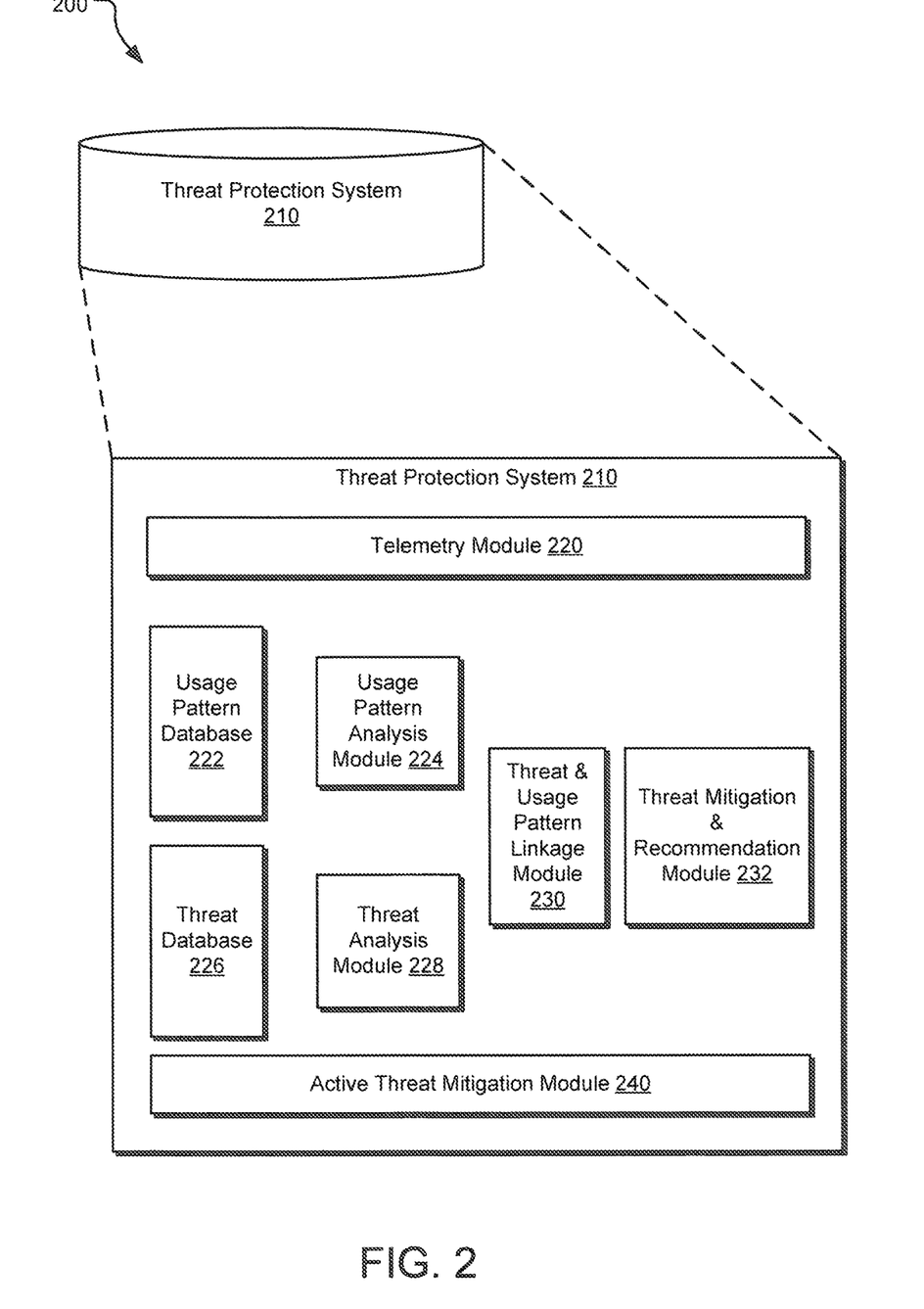
FIG. 2 illustrates an example implementation of a threat protection system disclosed herein.

FIG. 2 illustrates an example implementation 200 of a threat protection system 210. The threat protection system 210 may be implemented on a single server or on in cloud environment with various components being distributed among various servers. The threat protection system 210 includes a telemetry module 220 that may interact with various applications on clients' networks, various application servers, etc., to remotely collect usage patterns of various applications and application functionalities. The telemetry module 220 may store the usage patterns of various application functionalities in a usage pattern database 222.

A usage pattern analysis module 224 may analyze the usage patterns on a periodic basis to determine various characteristics of the application functionality usage for a client, for a user, or at a global level. For example, the usage pattern analysis module 224 may determine that a given functionality of an application is almost never used by a user. In that case, the usage pattern analysis module 224 may assign a low usage score to that functionality. Similarly, the usage pattern analysis module 224 may also determine that another functionality of an application is a core functionality for a user or a client, either based on frequency of use or based on some other usage characteristic. In this case, the usage pattern analysis module 224 may give a high usage score to this functionality for the given user or client.

The threat protection system 210 may also include a threat database 226. The threat database 226 may store various characteristics of various threats. For example, the threat database 226 may store the severity of disruption caused by each threat, the frequency with which the threat is activated, applications and/or application functionalities used by the threat to attach a computing device or a network, etc. The threat database 226 may collect such data over time based on threats to its member clients and users or gather such data from external sources. A threat analysis module 228 analyzes the data from the threat database 226 over time to determine various characteristics of various threats, especially as they relate to the applications and application functionalities.

A threat and usage pattern linkage module 230 analyzes the usage database 222 and the threat database 226 to link various threats and various usage patterns. A threat mitigation and recommendation module 232 analyzes the results of the threat & usage pattern linkage module 230 to generate one or more threat mitigation schemes and to generate and communicate recommendations to users. For example, based on the usage score of an application functionality, the linkage of that functionality to various threats, and the threat score, the threat mitigation and recommendation module 232 may recommend configuration settings for an application which proscribes enablement, disablement, opt-in, opt-out, etc., configuration settings for various application functionalities.

The threat protection system 210 also includes an active threat mitigation module 240 that monitors active or on-going threats and generates recommendation for modification to application configurations. For example, the active threat mitigation module 240 may identify an ongoing threat and analyze various application and application functionalities that may be vulnerable to such active/ongoing threat. Based on such identification, the active threat mitigation module 240 may modify various configuration settings for the application or generate and send recommendation for such changes to user or client administrators.

Figure 3:
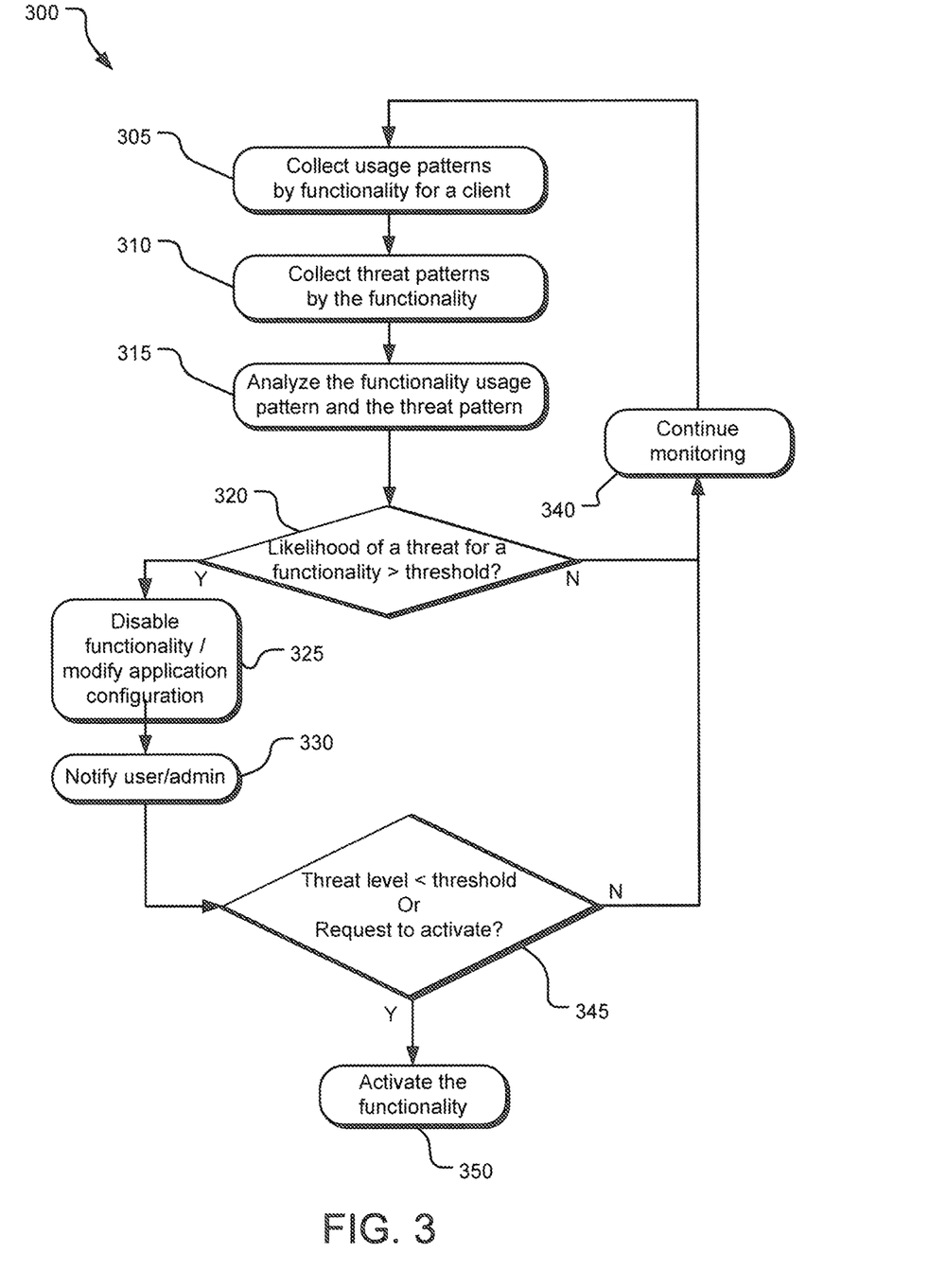
FIG. 3 illustrates example operations for providing personalized threat protection to users of one or more software applications.

FIG. 3 illustrates example operations 300 for providing personalized threat protection to users of one or more software applications. An operation 305 collects usage patterns for an application used by a client and its users. For example, the operation 305 may collect frequency of use, criticality of use, core/non-core characteristics of a functionality, over time for each user of a client organization. An operation 310 collects threat patterns to the application by functionality. For example, the operation 310 may determine that over time, a functionality of a word processor application that allows users to insert graphics is used various times to attack the word processor application, the user computing device, and the client network. Note that such threat pattern data is not merely collected from the users of the client organization, but they may also be collected globally from other clients and users that use the application.

After collecting the functionality usage pattern and the threat pattern by functionality, an operation 315 analyzes the collected and stored data pattern data. For example, the analyzing operation 315 may query such data, combine global threat data with the client specific threat data, etc. In one implementation, the analyzing operation 315 may rank the threat level to an application functionality by a given threat over a scale, such as between zero and one-hundred percentages. Alternatively, the analyzing operation 315 may also rank the application functionalities by their frequency of usage, criticality, etc.

A determining operation 320 determines whether the likelihood of a threat for a functionality is above a threshold. In one implementation, a cloud level threat protection system performing the operations 300 may determine the threshold level. Alternatively, an administrator of a client organization may be able to determine the threshold level. If the determining operation 320 determines that the likelihood of a threat for a functionality is above a threshold, an operation 325 disables the functionality and/or modifies the configuration settings of the application to reduce the threat of attack. For example, in the example of a word processor application where the threat level for an attack using a graphic insert functionality is above a threshold, the operation 325 may either disable the graphic insert functionality or limit the graphic insert to only trusted objects internal to the client organization network. Alternatively, the operation 325 may add additional warning to users before inserting any graphic object to a word processing document. An operation 330 also notifies the user and/or the administrator of a client organization of the modification to the application configuration and/or disablement of the application functionality.

If the determining operation 320 determines that the threat level is below the threshold, an operation 340 continues monitoring the usage patterns and the threat patterns.

An operation 345 may further compare the threat level to the threshold on a periodic basis and if it determines that the threat level has reduced below the threshold or if the client has requested activation of the functionality, an operation 350 may reactivate the functionality.

Figure 4:
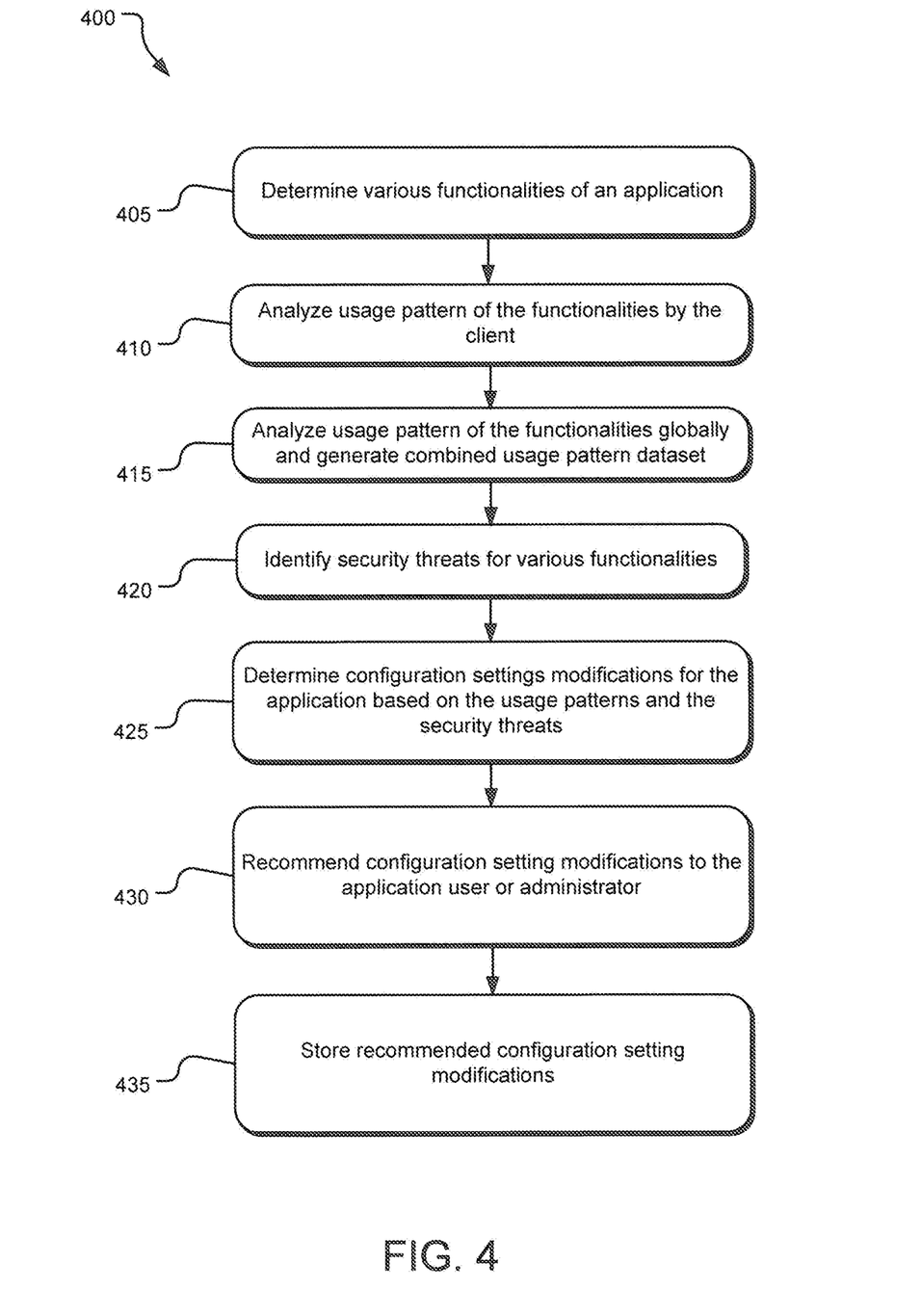
FIG. 4 illustrates example operations for determining configuration setting for personalized threat protection for users of one or more software applications.

FIG. 4 illustrates example operations 400 for determining configuration setting for personalized threat protection for users of one or more software applications. An operation 405 determines various functionalities of an application. For example, the operation 405 may tabulate the application functionalities in a database, a flat table, etc. The usage patterns of these functionalities by a client analyzed by an operation 410. For example, the operation 410 may analyze how often a given functionality is used by various users of a client organization.

An operation 415 also analyzes usage patterns of the functionalities at a global level. This may be useful when a client organization has initiated use of an application or its functionalities recently and therefore a mass of usage pattern data is not available. In one implementation, the operation 415 analyzes the global usage patterns for specific industry verticals to determine the usage patterns per industry. For example, the operation 415 may analyze the global usage patterns for clients and users in the healthcare industry to determine that a certain imaging functionality of an application is more useful in the healthcare industry. In one implementation, the weight allocated to the global usage patterns may be reduced over time as more personalized usage pattern data is collected. The operation 415 may also generate a combined usage pattern dataset based on the personalized client specific usage patterns and global usage patterns for the application functionalities.

In various implementations, the recommended configuration setting for various applications may be determined based on usage patterns of the application functionalities at various aggregation levels. For example, the recommended configuration setting may be based on usage pattern at global level including usage patterns of substantially all users of the application globally. Alternatively, the recommended configuration setting may be based on usage pattern at industry level including usage patterns of substantially all users of the application in a given industry, such as healthcare, education, etc. In another implementation, the recommended configuration setting may be based on usage pattern at enterprise or organization level including usage patterns of substantially all users of the application in an enterprise or organization. Similarly, the recommended configuration setting may be based on usage pattern at local level including usage patterns of the user. Furthermore, a combination of the such usage patterns at various levels may also be used to determine the recommended configuration setting for various applications.

An operation 420 identifies various security threats to the application functionalities. Such identification may be made based on external sources of threat information available to the threat protection system. Alternatively, such identification of threats by application functionality may be based on past attacks on the client organization and the use of the application functionalities for initiating such past attacks.

An operation 425 determines configuration setting modifications for the application based on the usage patterns for the application functionalities and the security threats to such application functionalities. For example, if the operation 420 determines that there is high threat level to an email functionality that allows the users to attach previous emails from other sources the operation 425 may determine that only other emails from the same email application are to be allowed to be attached by changing the configuration settings of the email application. An operation 430 communicates with an administrator of a client organization to recommend the modifications to the application. The recommended modifications to the configuration settings of the application are stored at an operation 435 for future analysis and usage.

Figure 5:
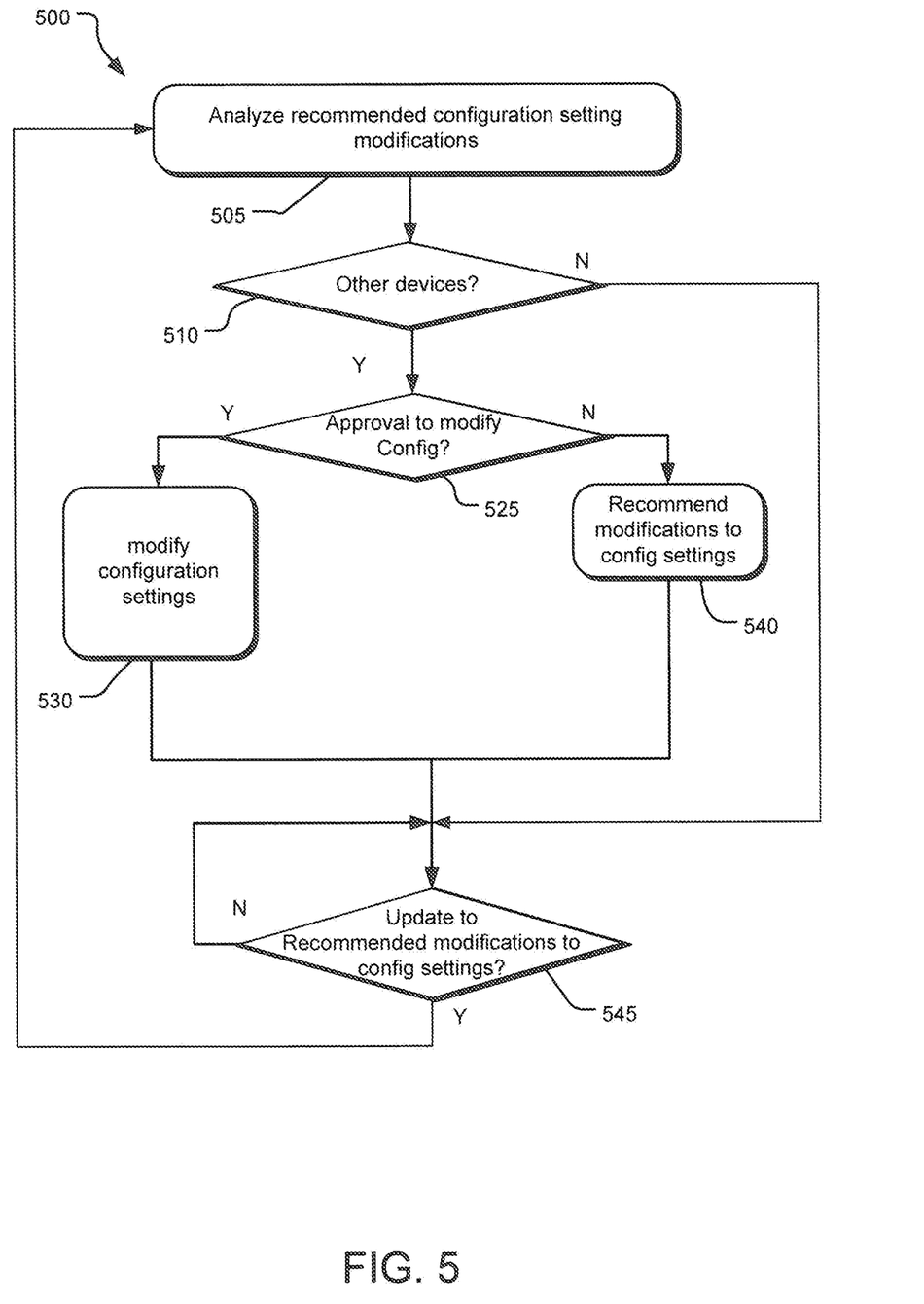
FIG. 5 illustrates example operations for modifying configuration setting for personalized threat protection for users of one or more software applications.

FIG. 5 illustrates example operations 500 for modifying configuration setting for personalized threat protection for users of one or more software applications. An operation 505 analyzes recommended configuration settings for an application for a given computing device. For example, if a user at a client organization is using a given computer application on a laptop and a tablet device, the operation 505 may analyze the application configuration settings for the laptop.

An operation 510 determines if the user is also using the same computer application on other devices, such as tablets, smartphones, etc. If so, an operation 525 determines if the threat protection system has approval to change the configuration settings on such other devices used by the user. Such approval may be granted, for example, by an administrator of a client organization or by the user. If it is determined that such approval is available, an operation 530 modifies the configuration settings for the application on other devices. If no approval is available, an operation 540 merely recommends such modification to the user or to an administrator. An operation 545 continues monitoring of the threat level to various application functionalities to determine if any updates to modification of configuration settings need to be recommended to user or administrator.

Figure 6:
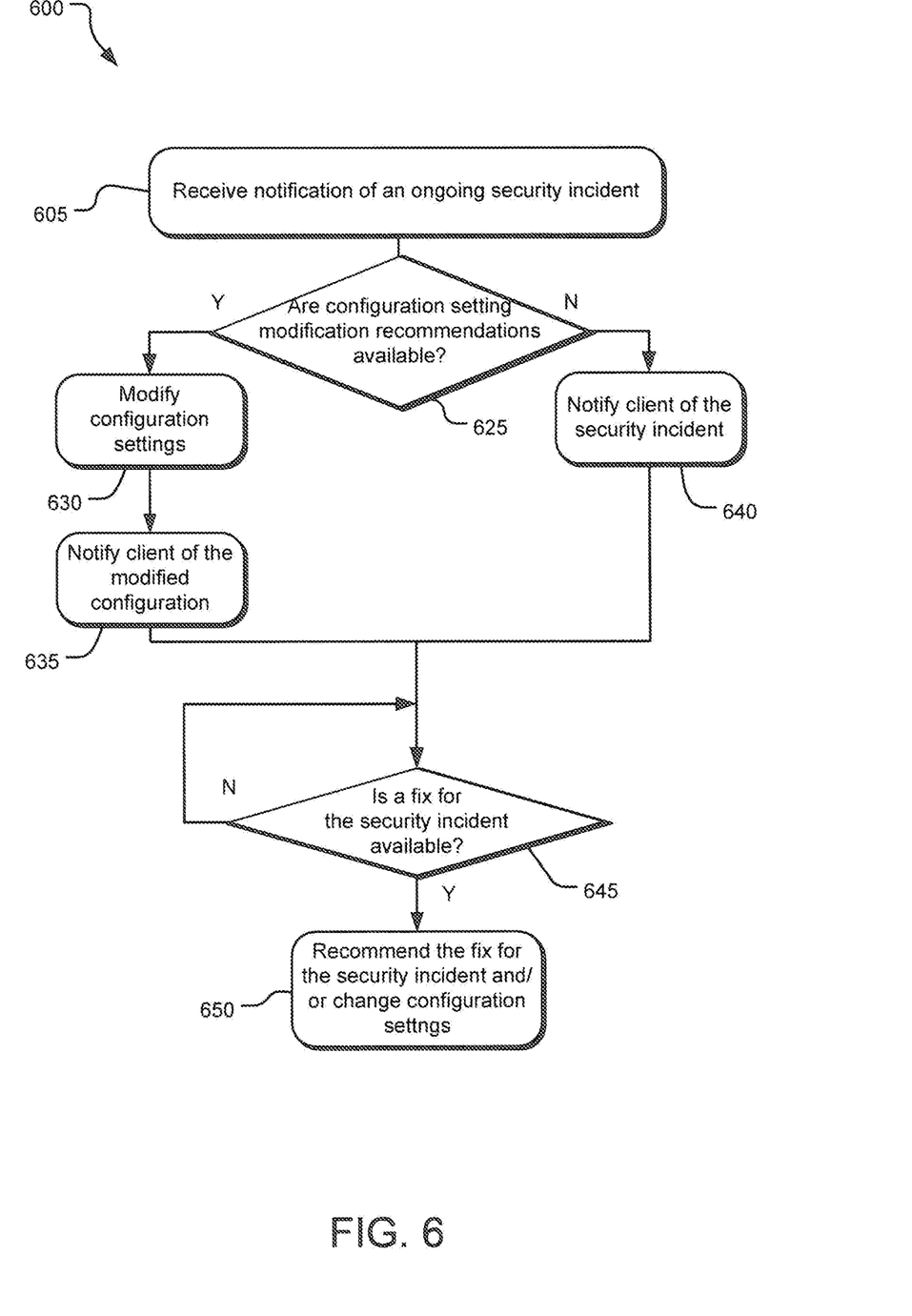
FIG. 6 illustrates example operations for addressing an ongoing security incident based on security configuration settings of users.

FIG. 6 illustrates example operations 600 for addressing an ongoing security incident based on security configuration settings of users. An operation 605 receives a notification of an ongoing threat or security incident. For example, such notification may be received from an external source such as a listserv, a blog, a computer threat monitoring service, etc. Alternatively, an administrator of a client organization may notify of an attack on one or more of its user devices.

An operation 625 determines if any configuration setting modification recommendations are available. Such recommendations may be stored by a threat protection system based on past analysis of application configurations. If such configuration settings recommendations are available, an operation 630 may modify the configuration settings and an operation 635 may notify the client of the modified configurations. If no such configuration settings recommendations are available, an operation 640 may simply notify the user and/or the client administrator of the ongoing threat so that they can take adequate precautions.

An operation 645 determines if a fix for the ongoing security incident is available and if so, an operation 650 recommends the fix for the security incident to the users. Furthermore, if the application configuration settings were modified, the operation 650 may also notify the users and administrators to make appropriate modification to reset the application configurations.

Figure 7:
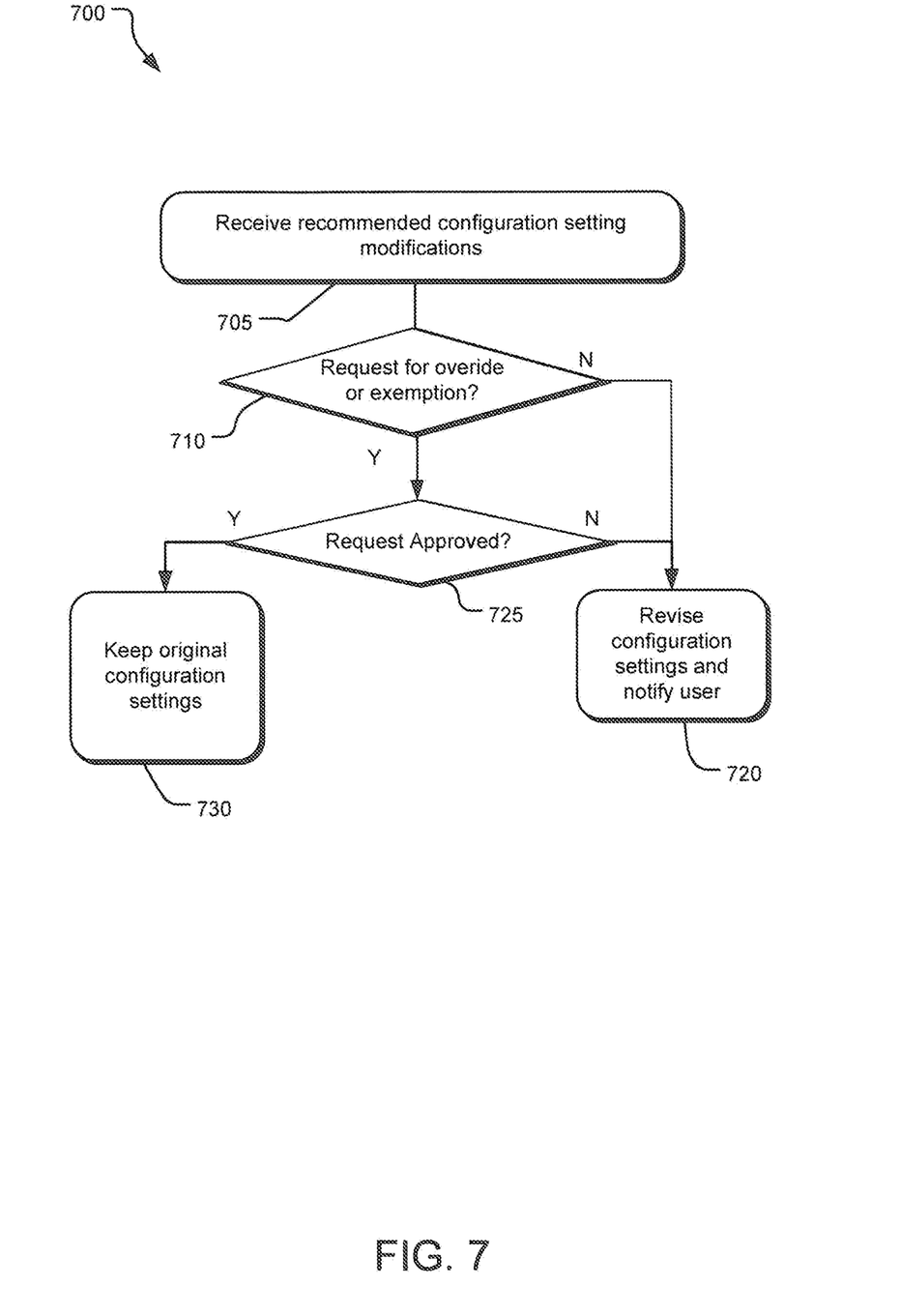
FIG. 7 illustrates example operations for managing configuration setting overrides and exceptions for various application functionalities.

FIG. 7 illustrates operations 700 for managing configuration setting overrides and exceptions for various application functionalities. An operation 705 receives recommended configuration setting modifications for various application to reduce the security threat. For example, an administrator of a client organization may receive the recommended configuration setting modifications. An operation 710 determines if there is any request for an override of or an exemption from the changes to the configuration settings. For example, a request for exemption from any changes to application configuration settings may be sent by a user to the administrator. Similarly, a user may request an override of changes to the application configuration settings.

If no such request exists, an operation 720 revises the configuration settings for the application based on the recommended configuration setting modifications and notifies the user of the changes. However, if any such request exists, an operation 725 determines if the request is approved. For example, only an administrator of a client organization may have the right to approve such request. If the request is approved, as per an operation 730, no changes are made to the application configurations. However, if the request is denied, the operation 720 revises the configuration settings and notifies the user of the changes.

Figure 8:
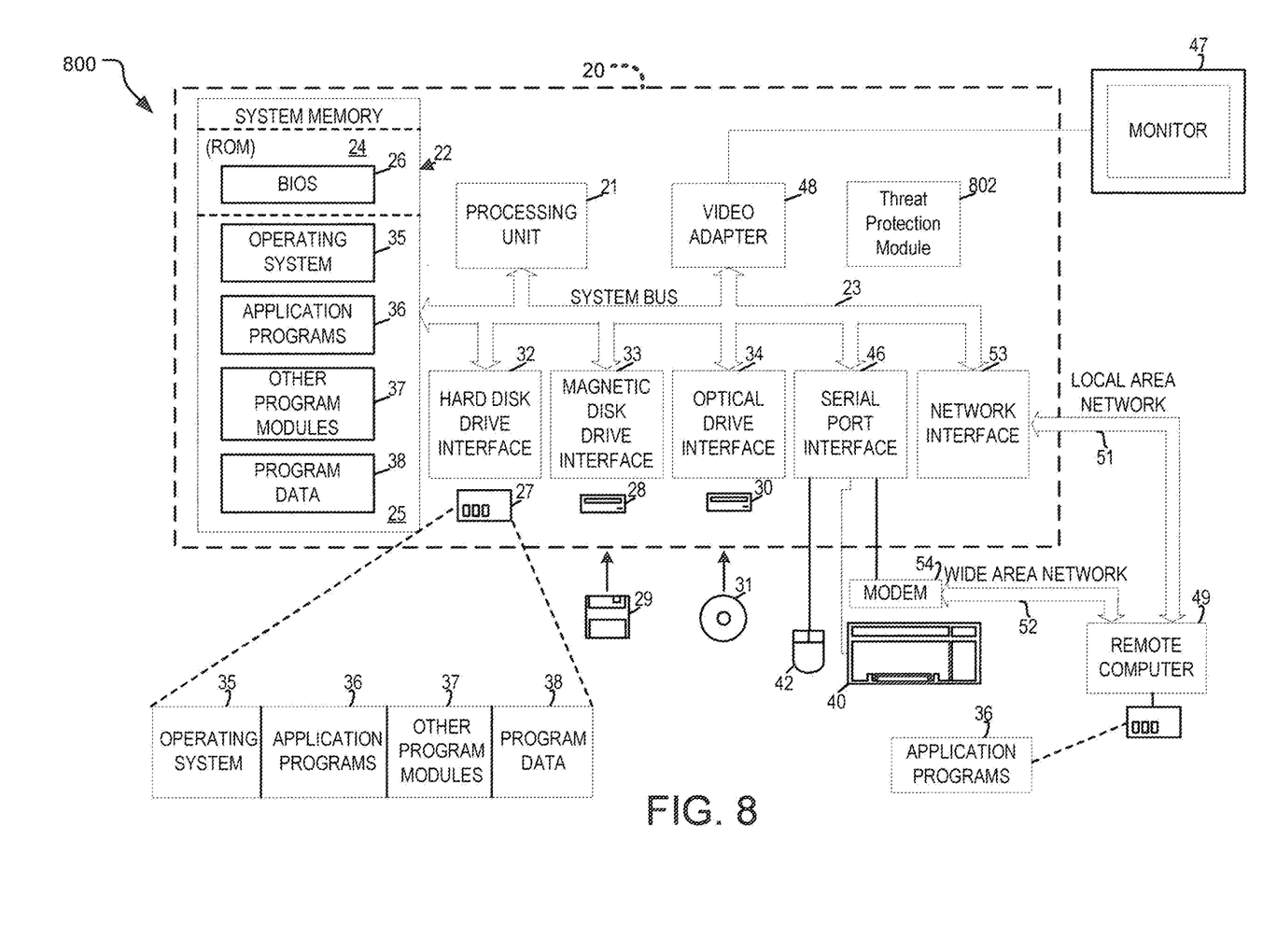
FIG. 8 illustrates an example system that may be useful in implementing the described technology.

FIG. 8 illustrates an example system 800 that may be useful in implementing the described technology for providing personalized threat protection. The example hardware and operating environment of FIG. 8 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively.

The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing personalized threat protection may be stored in memory 22 and/or storage devices 29 or 31 and processed by the processing unit 21. Rules for providing personalized threat protection may be stored in memory 22 and/or storage devices 29 or 31 as persistent datastores. For example, a threat protection module 802 may be implemented on the personal computer 20 (alternatively, the threat protection module 802 may be implemented on a server or in a cloud environment). The threat protection module 802 may utilize one of more of the processing unit 1, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for providing personalized threat protection may include a variety of tangible computer-readable storage media and intangible computer-readable communication signals. Tangible computer-readable storage can be embodied by any available media that can be accessed by the threat protection system 210 (as disclosed in FIG. 2) and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the threat protection system 210 (as disclosed in FIG. 2). In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The personalized threat protection system disclosed herein provides solution to a technological problem necessitated by security threats to software applications. Specifically, the personalized threat protection system disclosed herein provides an unconventional technical solution to this technological problem by analyzing usage pattern of the software application by a client to determine a plurality of software application functionalities used by the client, identifying a plurality of security threats related to one or more of the plurality of software application functionalities used by the client, and change the configuration settings of the software application for the client based on the plurality of security threats.

An implementations of a method of providing a personalized threat protection for a software application includes a analyzing usage pattern of the software application by a client to determine a plurality of software application functionalities used by the client, identifying a plurality of security threats related to one or more of the plurality of software application functionalities used by the client, and determining recommended configuration settings modifications for the software application based on the usage pattern of the software application and the plurality of security threats. In one implementation, the method further includes modifying the configuration settings of the software application for the client based on the recommended configuration settings modifications.

In another implementation, the client has a plurality of users. In yet another implementation, analyzing usage patterns of the software application further comprises analyzing frequency of the usage patterns of one or more of the plurality of software application functionalities by the plurality of users. Altnernatively, the method further includes receiving a notification of an ongoing threat to the software application and automatically modifying the configuration settings of the software application using the recommended configuration settings modifications. In an alternative implementation, the method further includes determining if the application is used by a client user on a plurality of devices and in response to determining that the application is used by a client user on a plurality of devices, propagating the recommended configuration settings modifications for the software application to one or more of the other devices used by the client user. Alternatively, determining recommended configuration settings modifications for the software application further comprises determining recommended configuration settings modifications for the software application based on the software application functionality being a core functionality.

Implementations of threat protection system disclosed herein includes a memory, one or more processor units, and a a threat protection system stored in the memory and executable by the one or more processor units, the threat protection system including a usage pattern analysis module configured to analyze usage patterns of one or more functionalities of an application, a threat analysis module configured to analyze threat patterns to the one or more functionalities of the application, and a threat mitigation and recommendation module configured to determine recommended configuration settings modifications for the application based on the usage patterns of the one or more functionalities of an application and the threat patterns to the one or more functionalities of the application.

In an alternative implementation, the the threat protection system further includes a telemetry module to remotely collect the usage patterns of the one or more functionalities of an application by a plurality of client users. Alternatively, the threat protection system further includes an active threat mitigation module configured to determine an ongoing threat to one or more functionalities of an application and to automatically modify the configuration settings of the application using the recommended configuration settings modifications. In another implementation, the threat protection system further including a threat and usage pattern linkage module configured to link threats by one or more of the application functionalities with usage pattern of the one or more of the application functionalitie.

A physical article of manufacture disclosed herein includes one or more tangible computer-readable storage media, encoding computer-executable instructions for executing on a computer system a computer process to provide personalized threat protection for an application, the computer process including analyzing usage pattern of the application by a client to determine a plurality of application functionalities used by the client, identifying a plurality of security threats related to one or more of the plurality of application functionalities used by the client, and modifying the configuration settings of the application for the client based on the plurality of security threats. In one implementation, analyzing usage patterns of the application further comprises analyzing frequency of the usage patterns of one or more of the plurality of application functionalities.

In an alternative implementation, analyzing usage patterns of the application further comprises analyzing criticality of one or more of the plurality of application functionalities. Yet alternatively, the computer process further comprises receiving a notification of an ongoing threat to the application, determining if recommended modifications to the configuration settings of the application are available, and automatically modifying the configuration settings of the application using the recommended modifications to the configuration settings. In yet another implementation, the computer process further comprises identifying a plurality of security threats related to one or more of the plurality of application functionalities used by the global users and determining recommended modifications to the configuration settings of the application based on usage pattern of one or more of the plurality of application functionalities by the global users and usage pattern of one or more of the plurality of application functionalities by the client.

In one implementation, determining recommended modifications to the configuration settings of the application further comprises determining recommended modifications to the configuration settings of the application based on usage pattern of one or more of the plurality of application functionalities used by global users within an industry vertical of the client and usage pattern of one or more of the plurality of application functionalities used by the client. In an alternative implementation, the computer process further comprises determining if the application is used by a client user on a plurality of devices and in response to determining that the application is used by a client user on a plurality of devices, propagating the configuration settings of the application to one or more of the other devices used by the client user. Alternatively, the computer process further comprises determining a characteristic of one of the plurality of application functionalities used by the client identifying the one of the plurality of application functionalities as a core functionality and determining recommended configuration settings of the application based on the characteristic.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more non-transitory tangible computer-readable storage device, encoding computer-executable instructions for executing on a computer system a computer process to provide personalized threat protection for a computer application, the computer process comprising:
   analyzing usage pattern of the computer application by a client to determine a plurality of computer application functionalities used by the client;
   identifying a plurality of security threats related to one or more of the plurality of computer application functionalities used by the client; and
   modifying configuration settings of the computer application for the client based on the plurality of security threats.

2. The physical article of manufacture of claim 1, wherein the client comprises a plurality of users.

3. The physical article of manufacture of claim 1, wherein analyzing usage patterns of the computer application further comprises analyzing frequency of the usage patterns of one or more of the plurality of computer application functionalities.

4. The physical article of manufacture of claim 1, wherein analyzing usage patterns of the computer application further comprises analyzing criticality of one or more of the plurality of computer application functionalities.

5. The physical article of manufacture of claim 1, wherein the computer process further comprising:
   receiving a notification of an ongoing threat to the computer application;
   determining if recommended modifications to the configuration settings of the computer application are available; and
   automatically modifying the configuration settings of the computer application using the recommended modifications to the configuration settings.

6. The physical article of manufacture of claim 1, wherein computer process further comprising:
   identifying a plurality of security threats related to one or more of the plurality of computer application functionalities used by the global users; and
   determining recommended modifications to the configuration settings of the computer application based on usage pattern of one or more of the plurality of computer application functionalities by the global users and usage pattern of one or more of the plurality of computer application functionalities by the client.

7. The physical article of manufacture of claim 6, wherein determining recommended modifications to the configuration settings of the computer application further comprises determining recommended modifications to the configuration settings of the computer application based on usage pattern of one or more of the plurality of computer application functionalities used by global users within an industry vertical of the client and usage pattern of one or more of the plurality of computer application functionalities used by the client.

8. The physical article of manufacture of claim 1, wherein the computer process further comprising:
   determining if the computer application is used by a client user on a plurality of devices; and
   in response to determining that the computer application is used by a client user on a plurality of devices, propagating the configuration settings of the application to one or more of the other devices used by the client user.

9. The physical article of manufacture of claim 1, wherein the computer process further comprising:
   determining a characteristic of one of the plurality of computer application functionalities used by the client identifying the one of the plurality of computer application functionalities as a core functionality; and
   determining recommended configuration settings of the computer application based on the characteristic.

10. A method of providing a personalized threat protection for a software application, the method comprising:
    analyzing, using a processor, usage pattern of the software application by a client to determine a plurality of software application functionalities used by the client;
    identifying a plurality of security threats related to one or more of the plurality of software application functionalities used by the client; and
    determining recommended configuration settings modifications for the software application based on the usage pattern of the software application and the plurality of security threats.

11. The method of claim 10, further comprising modifying the configuration settings of the software application for the client based on the recommended configuration settings modifications.

12. The method of claim 10, wherein the client comprises a plurality of users.

13. The method of claim 12, wherein analyzing usage patterns of the software application further comprises analyzing frequency of the usage patterns of one or more of the plurality of software application functionalities by the plurality of users.

14. The method of claim 11, further comprising:
    receiving a notification of an ongoing threat to the software application; and
    automatically modifying the configuration settings of the software application using the recommended configuration settings modifications.

15. The method of claim 12, further comprising:
    determining if the software application is used by a client user on a plurality of devices; and
    in response to determining that the software application is used by a client user on a plurality of devices, propagating the recommended configuration settings modifications for the software application to one or more of the other devices used by the client user.

16. The method of claim 10, wherein determining recommended configuration settings modifications for the software application further comprises determining recommended configuration settings modifications for the software application based on the software application functionality being a core functionality.

17. A system comprising:
  memory;
  one or more processor units;
  a threat protection system stored in the memory and executable by the one or more processor units, the threat protection system including:
    a usage pattern analysis module configured to analyze usage patterns of one or more functionalities of a computer application,
    a threat analysis module configured to analyze threat patterns to the one or more functionalities of the computer application, and
    a threat mitigation and recommendation module configured to determine recommended configuration settings modifications for the computer application based on the usage patterns of the one or more functionalities of the computer application and the threat patterns to the one or more functionalities of the computer application.

18. The system of claim 16, wherein the threat protection system further including a telemetry module to remotely collect the usage patterns of the one or more functionalities of the computer application by a plurality of client users.

19. The system of claim 17, wherein the threat protection system further including an active threat mitigation module configured to determine an ongoing threat to one or more functionalities of the computer application and to automatically modify the configuration settings of the application using the recommended configuration settings modifications.

20. The system of claim 18, wherein the threat protection system further including a threat and usage pattern linkage module configured to link threats by one or more of the computer application functionalities with usage pattern of the one or more of the computer application functionalities.

* * * * *